(12) United States Patent
Maniwa et al.

(10) Patent No.: US 7,639,299 B2
(45) Date of Patent: Dec. 29, 2009

(54) IMAGE PICKUP APPARATUS AND CONTROL METHOD THEREFOR

(75) Inventors: Junichi Maniwa, Komae (JP); Chiyumi Niwa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 358 days.

(21) Appl. No.: 11/672,986

(22) Filed: Feb. 9, 2007

(65) Prior Publication Data

US 2007/0188643 A1 Aug. 16, 2007

(30) Foreign Application Priority Data

Feb. 14, 2006 (JP) ............................. 2006-037253

(51) Int. Cl.
*H04N 5/222* (2006.01)
(52) U.S. Cl. .............................. 348/333.01; 348/207.2
(58) Field of Classification Search ........................ None
See application file for complete search history.

(56) References Cited

U.S. PATENT DOCUMENTS 5,701,529 A * 12/1997 Yokonuma et al. .......... 396/310
7,505,066 B2 * 3/2009 Kobayashi et al. ......... 348/207.2
2004/0041865 A1 3/2004 Yano et al.
2004/0141083 A1 * 7/2004 Takashima ............. 348/333.01

FOREIGN PATENT DOCUMENTS

| CN | 1471046 A | 1/2004 |
|---|---|---|
| JP | 11-272389 | 10/1999 |

OTHER PUBLICATIONS

The above references were cited in an Aug. 8, 2008 Chinese Office Action issued in the counterpart Chinese Patent Application 200710005319.3, a copy of which is enclosed with its English translation.

* cited by examiner

*Primary Examiner*—Tuan Ho
(74) *Attorney, Agent, or Firm*—Cowan, Liebowitz & Latman, P.C.

(57) ABSTRACT

An image pickup apparatus which performs an image pickup of an object and records a pickup image includes a display unit which displays an operation item for execution of operation corresponding to the operation mode of the image pickup apparatus, a communication unit which connects a peripheral device so as to allow communication, and a determination unit which determines whether the peripheral device is connected. The display unit displays a specific operation item in an already selected state in accordance with the determination result obtained by the determination unit.

13 Claims, 6 Drawing Sheets

IMAGE PICKUP APPARATUS AND CONTROL METHOD THEREFOR

BACKGROUND OF THE INVENTION

1. Field of the Invention

The present invention relates to a technique of improving the operability of an image pickup apparatus which picks up an image.

2. Description of the Related Art

Conventionally, many digital cameras and the like use a so-called menu system to allow users to easily use various functions at the time of an image pickup/reproducing operation. The menu system displays a plurality of operation items side by side on the display screen of an LCD or the like and makes the user select a target operation item by cursor movement based on button operation.

In addition, as digital cameras have been equipped with an increasing number of functions, the number of menu items have increased. For this reason, many digital cameras use a hierarchical menu system in which a menu comprises a plurality of sheets each including menu items associated with each other.

Such a menu system tends to require more button operations to select a target operation item.

In contrast to this, Japanese Patent Laid-Open No. 11-272389 discloses a technique of improving the operability at the time of menu display by omitting hierarchical display of operation items which need not be selected and displaying the next layer, when a user selects an arbitrary operation item from selectable items.

According to Japanese Patent Laid-Open No. 11-272389, if this system includes many selectable items and few items which need not be selected, the user must perform button operation to select a target operation item. This makes it impossible to expect an improvement in operability.

Conventionally, the purpose of connecting, for example, a printer to a digital camera is to print a pickup image. That is, this operation purpose is clear. In spite of this, in order to print a pickup image by a digital camera, the user needs to execute a procedure of connecting a printer to the digital camera, displaying a menu screen, and selecting an operation item associated with printing by button operation.

SUMMARY OF THE INVENTION

The present invention has been made in consideration of the above problems, and has as its object to implement a technique of simplifying operation on a menu screen.

In order to achieve the above object, according to the present invention, there is provided an image pickup apparatus which performs an image pickup of an object and records a pickup image, comprising:

a display unit adapted to display an operation item for execution of operation corresponding to an operation mode of the image pickup apparatus;

a communication unit adapted to connect a peripheral device so as to allow communication; and a determination unit adapted to determine whether the peripheral device is connected, wherein the display unit displays a specific operation item in an already selected state in accordance with a determination result obtained by the determination unit.

There is also provided a control method for an image pickup apparatus which includes an image pickup unit adapted to perform an image pickup of an object, a display unit adapted to display an operation item for execution of operation corresponding to an operation mode and a communication unit adapted to connect a peripheral device so as to allow communication, comprising:

a determination step of determining whether the peripheral device is connected; and a display step of displaying, on the display unit, a specific operation item in an already selected state in accordance with a determination result.

According to the present invention, displaying operation item, associated with a peripheral device connected to the apparatus, in an already selected state at the time of display of a menu screen makes it possible to simplify menu operation and greatly improve operability in using a function of the apparatus.

Further features of the present invention will become apparent from the following description of exemplary embodiments (with reference to the attached drawings).

BRIEF DESCRIPTION OF THE DRAWINGS

FIGS. 4A to 4H-2 are views each showing an example of a menu screen displayed on an image display unit;

DESCRIPTION OF THE EMBODIMENTS

The best mode for carrying out the present invention will be described in detail below with reference to the accompanying drawings.

Note that an embodiment to be described below is merely an example of implementing the present invention, and can be modified or changed, as needed, depending on the arrangement of an apparatus to which the present invention is applied and various conditions. The present invention is not limited to the following embodiments.

[Explanation of Apparatus]

Figure 1:
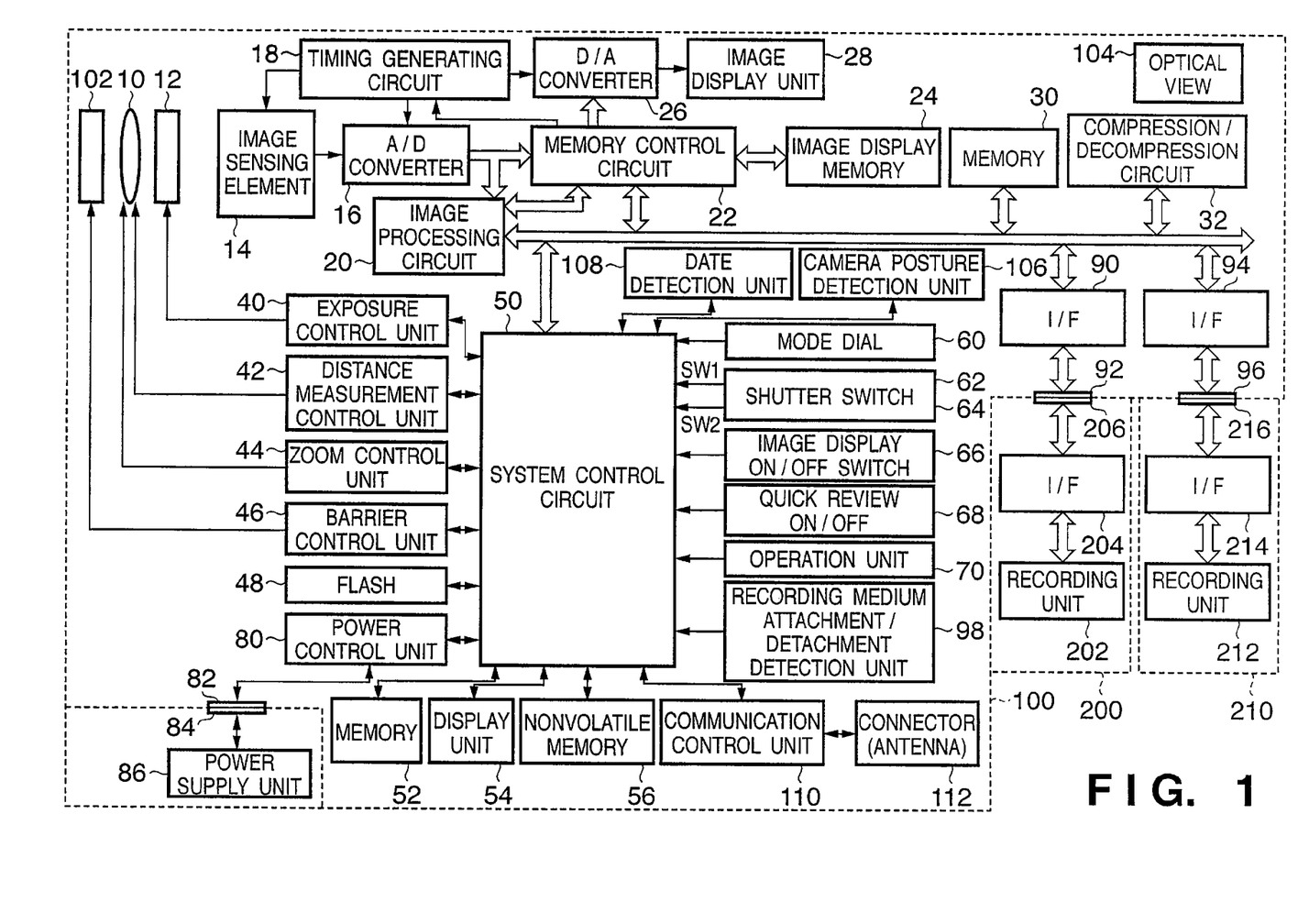
FIG. 1 is a block diagram showing the arrangement of an image pickup apparatus according to an embodiment of the present invention.

FIG. 1 is a block diagram showing the arrangement of an image pickup apparatus according to an embodiment of the present invention.

Referring to FIG. 1, reference numeral 100 denotes an image pickup apparatus typified by an electronic camera or the like.

Reference numeral 10 denotes a lens; 12, a shutter having a stop function; 14, an image sensing element which converts an optical image into an electrical signal; and 16, an A/D converter which converts an analog signal output from the image sensing element 14 into a digital signal.

Reference numeral 18 denotes a timing generating circuit which supplies clock signal and control signal to the A/D converter 16 and a D/A converter 26. A memory control circuit 22 and a system control circuit 50 control the timing generating circuit 18.

Reference numeral 20 denotes an image processing circuit which performs predetermined pixel interpolation processing and color conversion processing for data from the A/D converter 16 or data from the memory control circuit 22.

The image processing circuit 20 also performs predetermined arithmetic processing by using sensed image data. The system control circuit 50 controls an exposure control unit 40 and a distance measurement control unit 42 on the basis of the arithmetic processing result obtained by the image processing circuit 20, thus performing AF (Auto Focus) processing, AE (Auto Exposure) processing, and EF (Electronic Flash pre-emission) processing of the TTL (Through The Lens) system.

In addition, the image processing circuit 20 performs predetermined arithmetic processing by using sensed image data, and performs AWB (Auto White Balance) processing of the TTL system on the basis of the obtained arithmetic processing result.

Reference numeral 22 denotes a memory control circuit which controls the A/D converter 16, the timing generating circuit 18, the image processing circuit 20, an image display memory 24, the D/A converter 26, a memory 30, and a compression/decompression circuit 32.

Data from the A/D converter 16 is written in the image display memory 24 or the memory 30 through the image processing circuit 20 and the memory control circuit 22 or is written in the image display memory 24 or the memory 30 directly through the memory control circuit 22.

Reference numeral 28 denotes an image display unit comprising a TFT LCD and the like. The image display unit 28 displays display image data written in the image display memory 24 through the D/A converter 26.

Sequentially displaying sensed image data on the image display unit 28 makes it possible to implement an electronic viewfinder (EVF) function.

The image display unit 28 can arbitrarily turn on/off display in accordance with an instruction from the system control circuit 50. Turning off display can greatly reduce the power consumption of the image pickup apparatus 100.

The memory 30 stores pickup still and moving images, and has a storage capacity large enough to store a predetermined number of still images or a predetermined time period of moving images.

For this reason, in the case of continuous shooting to continuously pick up a plurality of still images, or in the case of panoramic shooting, it is possible to perform image writing into the memory 30 at high speed and in large volume.

Furthermore, it is possible to use the memory 30 as a work area of the system control circuit 50.

The compression/decompression circuit 32 compresses/decompresses image data by adaptive discrete cosine transform (ADCT) or the like. The compression/decompression circuit 32 receives image data stored in the memory 30, performs compression processing or decompression processing in accordance with the JPEG or MPEG format, and writes the processed data in the memory 30.

The exposure control unit 40 controls the shutter 12 having the stop function and also has a flash brightness control function in conjunction with a flash 48.

The distance measurement control unit 42 controls focusing of the lens 10. A zoom control unit 44 controls zooming of the lens 10. A barrier control unit 46 controls the operation of a barrier 102.

The exposure control unit 40 and the distance measurement control unit 42 are controlled by the TTL system. The system control circuit 50 controls the exposure control unit 40 and the distance measurement control unit 42 on the basis of the result obtained by arithmetic processing of sensed image data using the image processing circuit 20.

The flash 48 has an AF auxiliary light projection function and the flash dimming function.

The system control circuit 50 controls the entire image pickup apparatus 100. Reference numeral 52 denotes a memory which stores constants, variables, programs, and the like for the operation of the system control circuit 50.

Reference numeral 54 denotes a display unit which comprises a liquid crystal display, a speaker, and the like, and displays an operation state, a message, and the like using characters, images, sounds, and the like in accordance with the execution of a program by the system control circuit 50. The image pickup apparatus 100 has one or a plurality of display units 54 arranged at easily observable positions near the operation unit. The display unit 54 comprises a combination of an LCD, an LED, a sound producing element, and the like.

Part of the function of the display unit 54 is set in an optical viewfinder 104.

Of the display contents of the display unit 54, those displayed on the LCD or the like include a single shot/continuous shooting mode indication, a self-timer indication, a compression ratio indication, an indication of the number of recording pixels, an indication of the number of recorded images, an indication of the number of remaining images that can be picked up, and the like. Other display contents include a shutter speed indication, an F-number indication, an exposure correction indication, a flash indication, a red-eye reduction indication, a macro shooting indication, a buzzer setting indication, a remaining timepiece battery level indication, a remaining battery level indication, an error indication, an information indication by a number composed of a plurality of digits, and the like. Such display contents further include an indication of the attachment/detachment state of a recording media 200 and 210, a communication I/F operation indication, a date/time indication, and the like.

Of the display contents of the display unit 54, those displayed in the optical viewfinder 104 include an in-focus indication, camera shake warning indication, flash charge indication, shutter speed indication, F-number indication, exposure correction indication, and the like.

Reference numeral 56 denotes a nonvolatile memory that is electrically erasable/recordable. This apparatus uses an EEPROM or the like as the nonvolatile memory 56.

Reference numerals 60, 62, 64, 66, 68, and 70 denote operation devices for inputting various operation instructions to the system control circuit 50. Each of these devices comprises a switch, a dial, a touch panel, a pointing device by line-of-sight detection, a voice recognition device, or the like or a combination thereof.

These operation devices will be concretely described below.

The mode dial switch 60 allows switching/setting of the following function modes including a power OFF mode, automatic shooting mode, manual shooting mode, panoramic shooting mode, reproduction mode, multi-screen reproducing/erase mode, PC connection mode, and the like.

The shutter switch SW1 62 is turned ON by pressing a shutter button (not shown) half and instructs the start of various operations, such as AF (Auto-Focus) processing, AE (Auto-Exposure) processing, AWB (Auto-White-Balance) processing, and EF (Flash Pre-Emission) processing.

Fully pressing the shutter button (not shown) turns on the shutter switch SW2 64. This operation issues an instruction to start exposure processing of writing a signal read from the image sensing element 14, as image data, in the memory 30 through the A/D converter 16 and the memory control circuit 22. In addition, the shutter switch SW2 64 issues an instruction to start development processing using arithmetic processing in the image processing circuit 20 and the memory control circuit 22. The shutter switch SW2 64 further issues an instruction to start recording processing of reading image data from the memory 30, compressing the data in the compression/decompression circuit 32, and writing the image data in the recording medium 200 or 210.

Using the image display ON/OFF switch 66 makes it possible to make the setting of the ON/OFF state of the image display unit 28. Power saving can be achieved by shutting off the supply of power to the image display unit 28 comprising a TFT LCD and the like by using this function when shooting an image by using the optical viewfinder 104.

The quick review ON/OFF switch 68 sets a quick review function of automatically reproducing sensed image data immediately after image picking up. Assume that in this embodiment, in particular, this apparatus comprises a function of setting the quick review function when the image display unit 28 is turned off.

The operation unit 70 comprises various buttons, a touch panel, and the like. More specifically, the operation unit 70 includes a menu button, set button, macro button, multi-screen reproducing/new page button, flash setting button, single shot/continuous shooting/self-timer switching button, and the like. The operation unit 70 also includes a menu movement + (plus) button, menu movement – (minus) button, reproducing image movement + (plus) button, reproducing image movement – (minus) button, and the like. Furthermore, the operation unit 70 includes a pickup image quality selection button, exposure correction button, date/time setting button, image deletion button, image deletion cancel button, and the like.

Reference numeral 80 denotes a power control unit which comprises a power supply detection circuit, a DC/DC converter, a switch circuit which switches blocks to be energized, and the like. The power control unit 80 detects the attachment/detachment of a battery, the type of battery, and a remaining battery level, and controls the DC/DC converter on the basis of the detection result and an instruction from the system control circuit 50, thereby applying a necessary voltage to each unit including a recording medium for a necessary period of time.

Reference numerals 82 and 84 denote connectors; and 86, a power supply unit which comprises a primary battery, such as an alkaline battery or a lithium battery, a secondary battery such as an NiCd battery, an NiMH battery, or an Li battery, an AC adaptor, and the like.

Reference numerals 90 and 94 denotes interfaces for recording media such as a memory card and a hard disk. Reference numerals 92 and 96 denote connectors for connection to recording media such as a memory card and a hard disk. Reference numeral 98 denotes a recording medium attachment/detachment detection unit which detects whether the recording medium 200 or 210 connects to the connector 92 or 96.

Although this embodiment has exemplified the apparatus including two systems of interfaces and connectors for the attachment of recording media, the apparatus may comprise either a single system or a plurality of systems of interfaces and connectors for the attachment of recording media. In addition, the apparatus may comprise a combination of interfaces and connectors with different standards.

The apparatus can use, as interfaces and connectors, those complying with standards such as the PCMCIA card standard and the CF (CompactFlash (registered trademark) card standard. In this case, various types of communication cards such as a LAN card, a modem card, a USB card, an IEEE1394 card, a P1284 card, a SCSI card, and a communication card for PHS connect to the interfaces and connectors. This makes it possible to transfer image data and management information attached to image data to/from other computers and peripheral devices such as printers.

The barrier 102 serves as a protection device which covers an image sensing unit including the lens 10 of the image pickup apparatus 100 to prevent the image sensing unit from being contaminated and damaged.

Using only the optical viewfinder 104 makes it possible to perform image shooting without using the electronic viewfinder function of the image display unit 28. In addition, information associated with some of the functions displayed on the display unit 54 and displayed in the optical viewfinder 104 includes an in-focus indication, camera shake warning indication, flash charge indication, shutter speed indication, F-number indication, exposure correction indication, and the like.

Reference numeral 106 denotes a camera posture detection unit which detects the posture state of the image pickup apparatus 100, i.e., the direction state of the image sensing surface of the image sensing element 14 mounted in this apparatus. This apparatus uses, for example, a gravity sensor as a sensor for detecting a posture state.

Reference numeral 108 denotes a date detection unit which measures the time by using a real-time clock (RTC) which is a timepiece incorporated in this apparatus. This timepiece operates on power supplied from a built-in battery even while this apparatus is OFF. The date detection unit 108 measures the time acquired from the real-time clock, and performs control within the interval from 0:0:0 Jan. 1, 1980 to 23:59:59 Dec. 31, 2030 as an effective date range.

Reference numeral 110 denotes a communication control unit which includes various communication functions such as RS232C, USB, IEEE1394, P1284, SCSI, modem, LAN, and wireless communication.

Reference numeral 112 denotes a wired connector such as a USB connector or an IEEE1394 connector which connects the image pickup apparatus 100 to another device by using the communication control unit 110.

The recording medium 200 is a memory card, a hard disk, or the like.

The recording medium 200 comprises a recording unit 202 comprising a semiconductor memory, a magnetic disk, or the like, an interface 204 for the image pickup apparatus 100, and a connector 206 for connection to the image pickup apparatus 100.

The recording medium 210 is a memory card, a hard disk, or the like.

The recording medium 210 comprises a recording unit 212 comprising a semiconductor memory, a magnetic disk, or the like, an interface 214 for the image pickup apparatus 100, and a connector 216 for connection to the image pickup apparatus 100.

Figure 2:
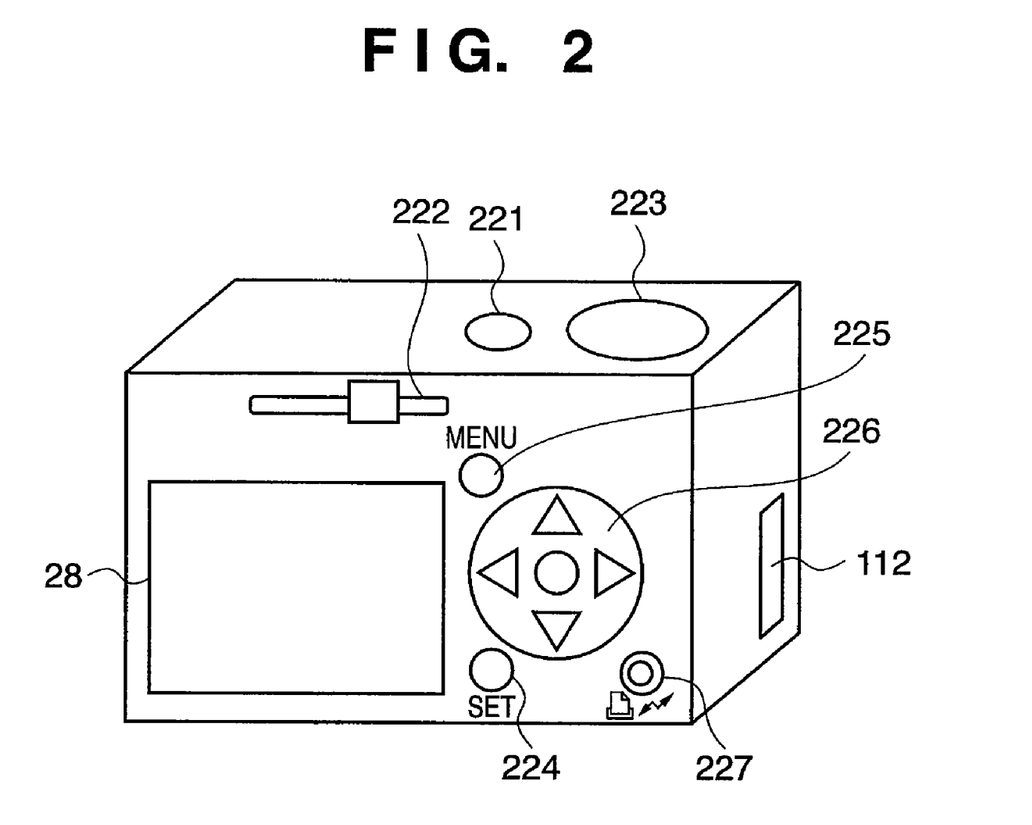
FIG. 2 is a perspective view of an electronic camera to which an image pickup apparatus of the present invention is applied.

FIG. 2 is a perspective view of an electronic camera to which the image pickup apparatus of the present invention is applied.

Referring to FIG. 2, reference numeral 221 denotes a button for turning on/off the power supply; 222, a mode switching lever for switching function modes such as an image shooting mode, reproducing mode, moving image shooting mode, and still image shooting mode; and 223, a shutter button for operating the shutter switches SW1 and SW2.

The image display unit 28 displays a pickup image by the camera. This apparatus generally uses an LCD (Liquid Crystal Display) as the image display unit 28 (to be also referred to as an LCD hereinafter). The LCD 28 displays a menu screen for performing reproducing operation and the like of still images and/or moving images.

Reference numerals 224, 225, and 226 respectively denote a SET button, MENU button, and cross-hair button, which are used to change image shooting parameters and camera settings. In the reproducing mode, the user performs image feed by pressing the left and right buttons.

The connector 112 is a digital terminal, which connects a cable such as a USB cable to a peripheral device such as a computer or a printer to perform communication.

Reference numeral 227 denotes an easy direct button, which incorporates an LED. Turning on or blinking the LED can turn on or blink the button itself.

Figure 5A:
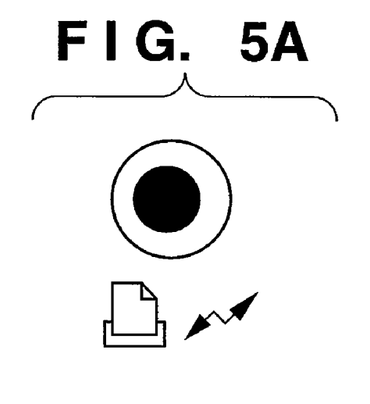
FIG. 5A is a view showing the ON state of an easy direct button.
Figure 5B:
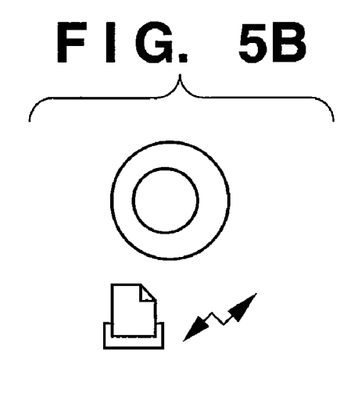
FIG. 5B is a view showing the OFF state of the easy direct button.

FIGS. 5A and 5B respectively show the ON state and OFF state of the easy direct button.

When the easy direct button 227 is off, the LED is off as shown in FIG. 5B. Assume that the camera connects to a printer through a USB cable or the like. In this case, displaying an image which can be printed on the LCD 28 in the reproducing mode will turn on the LED as shown in FIG. 5A.

The button itself turns on in this manner. This allows the user to recognize that he/she can print by only pressing the button. That is, the user can easily perform printing operation. When the user presses this button to perform printing operation after the button turns on, the LED switches to the blinking state to indicate that printing operation is in process.

Figure 3:
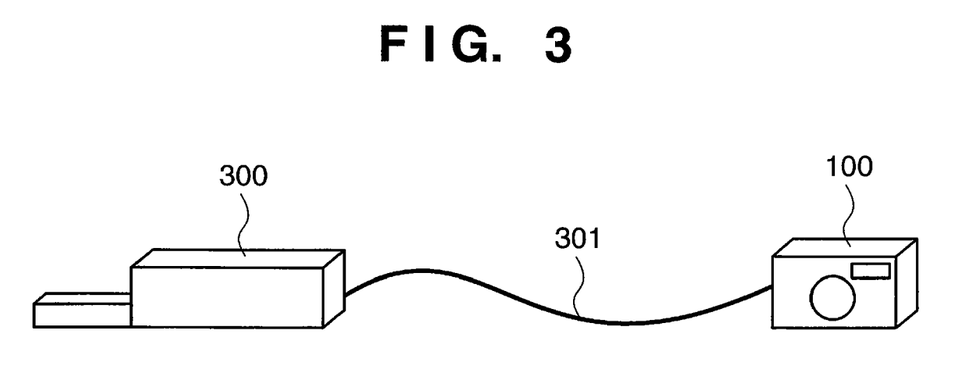
FIG. 3 is a perspective view showing a state wherein a camera connects to a printer.

FIG. 3 shows a state wherein the camera connects to a printer.

Connecting a printer 300 to the camera 100 through a communication cable 301 makes it possible to directly print an image by using the printer 300 on the basis of a DPOF file recorded on the recording medium 200 or 210 mounted in the camera 100.

In addition, this embodiment uses a detachable recording medium such as an SD card (registered trademark) having a write inhibition function as a recording medium which records images and DPOF files.

[Menu Screen]

FIG. 4 shows an example of a menu screen displayed on the image display unit in the reproducing mode.

Assume that in the case shown in FIG. 3, the camera 100 is disconnected to the printer 300. In this case, pressing the MENU button 225 upon setting the camera 100 in the reproducing mode will set a reproducing menu tab M1 shown in FIG. 4A in the selected state and pull-down display the detailed items of the reproducing menu M1. In this state, the user can move to any one of the items of the reproducing menu M1 by operating the up and down buttons of the cross-hair button 226, and select and execute operation associated with reproducing.

Figure 4A:
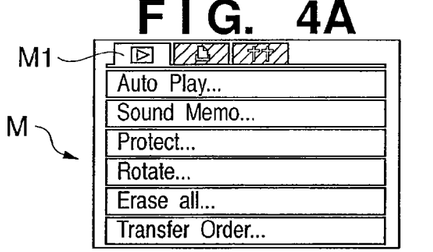
Figure 4B:
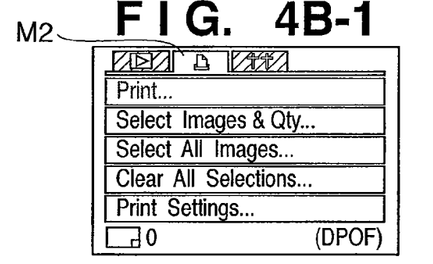

As shown in FIG. 4A, while the main menu tab M is selected, the user can move the main menu tab M to left and right with the left and right buttons of the cross-hair button 226, and can also move to a tab other than the reproducing menu tab M1, e.g., a print menu tab M2 shown in FIG. 4B-1.

When the camera 100 is connected to the printer 300, pressing the MENU button 225 upon switching the camera 100 to the reproducing mode will select the print menu tab M2 shown in FIG. 4B-1, thereby pull-down displaying the detailed items of the print menu M2. In this state, the user can move one of the items of the print menu M2 up and down with the up and down buttons of the cross-hair button 226, and select and execute operation associated with printing. As shown in FIG. 4B-1, while the main menu tab M is selected, the user can move the main menu tab M to left and right with the left and right buttons of the cross-hair button 226, and move to a tab other than the print menu tab M2, e.g., the reproducing menu tab M1 shown in FIG. 4A.

When the printer is connected to the camera while another menu tab or menu item is displayed, the camera displays a menu screen with the print menu tab M2 being selected, as shown in FIG. 4B-1, regardless of the currently displayed menu screen.

As described above, when the printer 300 is connected to the camera 100, pressing the MENU button 225 will automatically display a menu screen with the print menu tab M2 being selected. This allows the user to select and execute operation associated with printing by only simple operation following the display of the menu screen.

Note that the DPOF (Digital Print Order Format) standard is a unified standard for the automation of printing digital images recorded on the recording media 200 and 210. This standard sets (reserves) in advance images to be printed and print instruction information such as the number of prints and addition/non-addition of a date, and records the set information on a recording medium. The recording medium records a file in which print instruction information is written (to be referred to as a DPOF file hereinafter) as a text file different from an image file.

If the recording media 200 and 210 mounted in the camera 100 record no DPOF file, i.e., no print instruction information, since no image to be printed is designated, the printer cannot start printing in this state. For this reason, displaying the menu screen by pressing the MENU button 225 in this state will display the "Print . . . " item of the print menu M2 in grayscale or the like and invalidate (disable) selecting operation, as shown in FIG. 4B-1.

Figure 4B:
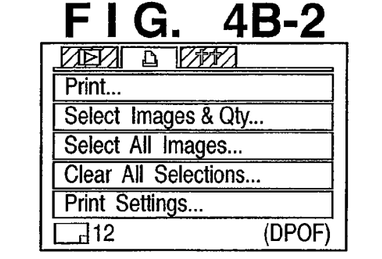

If a DPOF file exists in a recording medium, i.e., the medium records print instruction information, since an image to be printed has already been designated, the printer can immediately start printing. For this reason, displaying the menu screen by pressing the MENU button 225 in this state will display the "Print . . . " item in the state which validates (enables) selection, as shown in FIG. 4B-2.

When the user selects the "Print . . . " item by using the up and down buttons of the cross-hair button 226 and presses the SET button 224, the camera displays the print instruction screen shown in FIG. 4C. In this case, the printer prints on 12 sheets as the default. Selecting "Style" and pressing the SET button 224 on this screen make it possible to change a setting associated with the print style, e.g., borderless/bordered. In, addition, when the user selects "Print" and presses the SET button 224, the printer 300 starts printing an image in accordance with the print instruction information recorded on the DPOF file.

Referring to FIG. 4B-1, when the user selects "Select Images & Qty . . . " by using the up and down buttons of the cross-hair button 226 and presses the SET button 224, the camera displays the print image selection screen shown in FIG. 4D. This screen allows the user to designate the number of prints for each image recorded on the recording medium by using the up and down buttons of the cross-hair button 226. The user can designate the number of prints for each of a plurality of images. That is, the user can designate the number of prints for each image while switching and reproducing a plurality of images recorded on the recording medium by using the left and right buttons of the cross-hair button 226.

When the user designates the number of prints, the camera also records the number of prints as print instruction information on a DPOF file. If the DPOF file has already recorded the number of prints, the camera displays the number of prints corresponding to a reproduced image read from the DPOF file, as shown in FIG. 4D, when reproducing the image.

Figure 4C:
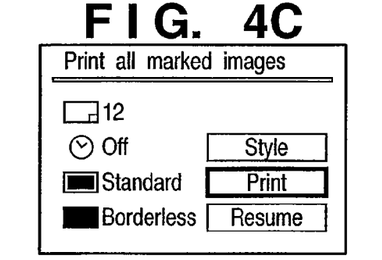
Figure 4D:
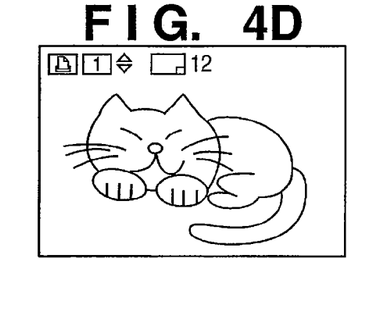
Figure 4E:
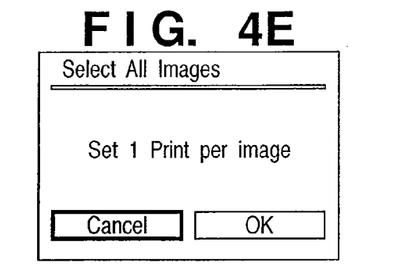
Figure 4F:
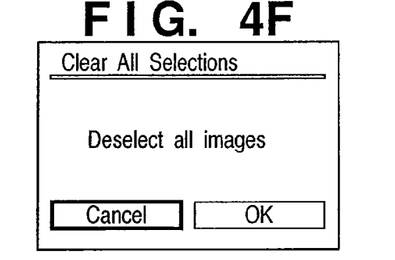
Figure 4G:
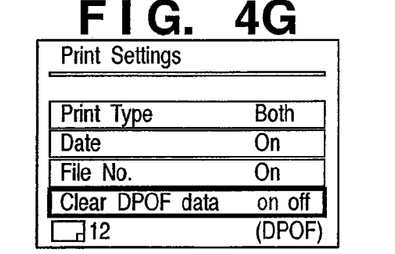

If one or more prints are designated while the camera 100 is connected to the printer 300, pressing the easy direct button 227 in the ON state makes it possible to display the print instruction screen in FIG. 4C and immediately start printing.

In the state shown in FIG. 4B-1, when the user selects "Select All Images . . . " by using the up and down buttons of the cross-hair button 226 and presses the SET button 224, the camera displays the all-image print screen shown in FIG. 4E. Selecting "OK" and pressing the SET button 224 on this screen can perform print designation for each of the all images recorded on the recording medium altogether. A DPOF file then records print instruction information, i.e., an instruction to print one each of all the images. Since this all-image print screen is used to print all images, the camera turns on the easy direct button 227 when connecting to the printer. Pressing the easy direct button 227 in the ON state will perform print designation for all the images, record the corresponding information on a DPOF file, and display the print screen shown in FIG. 4C. Selecting the "Print" item and pressing the easy direct button 227 can immediately start printing.

Referring to FIG. 4B-1, when the user selects "Clear All Selections . . . " by using the up and down buttons of the cross-hair button 226 and presses the SET button 224, the camera displays the print designation cancel screen shown in FIG. 4F. Selecting "OK" and pressing the SET button 224 on this screen will cancel the print designation for all the images recorded on the DPOF file. That is, the camera erases the print designation information which has already been recorded on the DPOF file.

Referring to FIG. 4B-1, when the user selects "Printing Settings . . . " by using the up and down buttons of the cross-hair button 226 and presses the SET button 224, the camera displays the print setting screen shown in FIG. 4G. This screen allows the user to make settings associated with print conditions. In "print Type", the user can select whether to perform normal printing or index printing or both types of printing. "Date" allows to select whether to print the date of picking up the image when printing the image. "File No." allows to select whether to print the file number of the image when printing the image. "Clear DPOF Data" allows to select whether to erase the DPOF file so as to cancel the print instruction.

[Menu Screen Display Processing]

Figure 6:
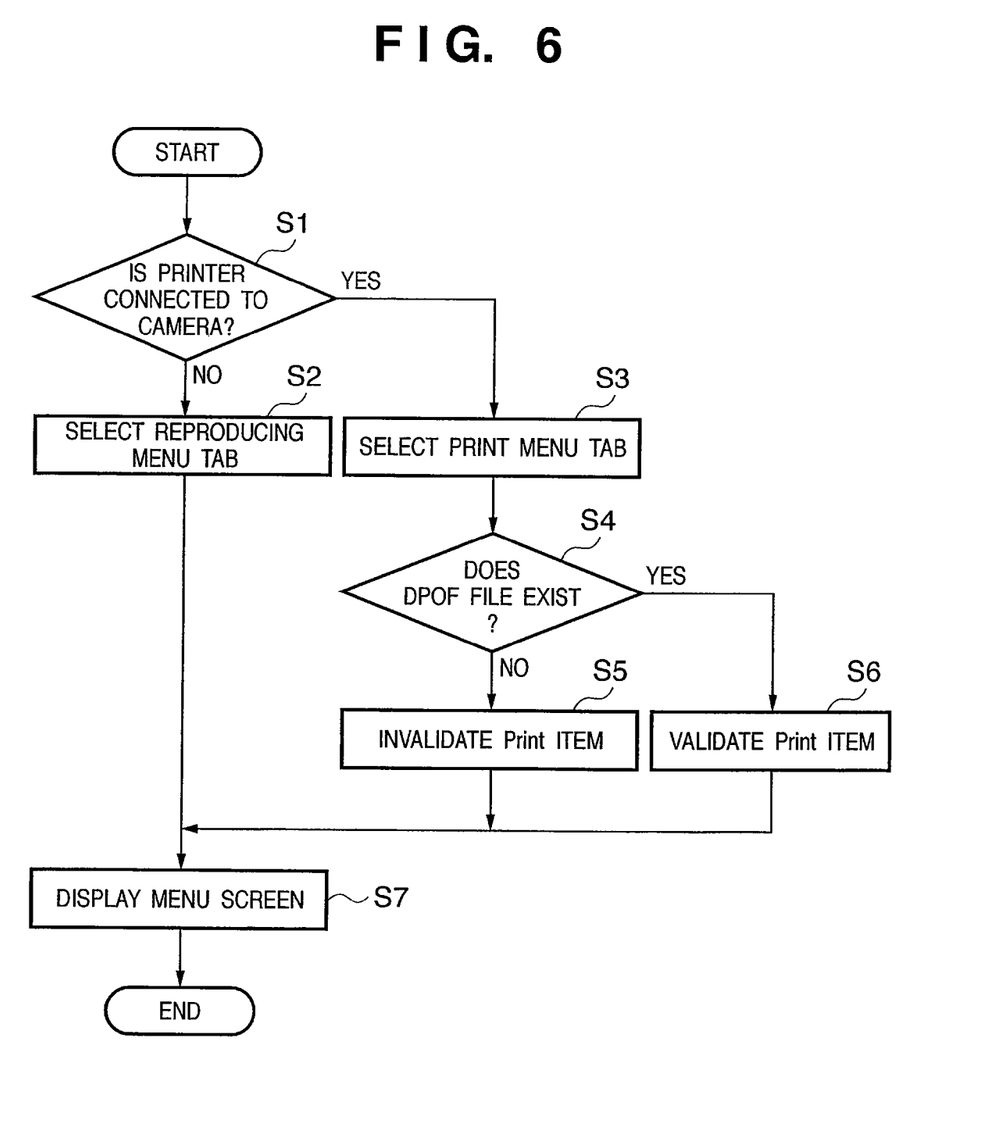
FIG. 6 is a flowchart showing menu screen display processing by a camera according to this embodiment.

FIG. 6 is a flowchart showing menu screen display processing by the camera according to the present invention.

When the user presses the MENU button 225 during the operation of the camera in the reproducing mode, the system control circuit 50 determines whether the printer 300 is connected to the camera 100 (S1).

If the system control circuit 50 determines in step S1 that the printer 300 is disconnected to the camera 100, the camera sets the reproducing menu tab M1 in the selected state (S2) and displays the menu screen with the reproducing menu tab M1 shown in FIG. 4A being selected (S7).

If the system control circuit 50 determines in step S1 that the printer is connected to the camera 100, the camera sets the print menu tab M2 in the selected state (S3). The process then advances to step S4.

The system control circuit 50 then determines whether any DPOF file exists in the recording medium 200 or 210 (S4). If the system control circuit 50 determines that no DPOF file exists in the recording medium 200 or 210, the system control circuit 50 invalidates the "Print . . . " item.

Subsequently, the system control circuit 50 selects the print menu tab M2 shown in FIG. 4B-1, the camera displays the menu screen with the "Print . . . " item being invalidated (S7).

If the system control circuit 50 determines in step S4 that a DPOF file exists in the recording medium 200 or 210, the system control circuit 50 validates the "Print . . . " item (S6). Subsequently, when the user selects the print menu tab M2 shown in FIG. 4B-2, the camera displays the menu screen with the "Print . . . " item being validated (S7).

As described above, according to this embodiment, displaying an optimal menu screen corresponding to the state of the camera when displaying a menu screen makes it possible to simplify operation on the camera, thereby implementing a camera with excellent operability.

Other Examples

Figure 4H:
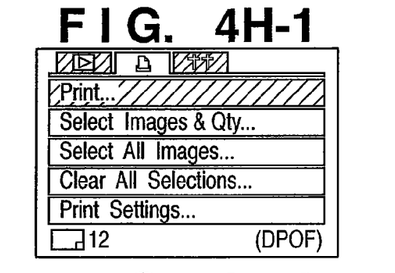

In the above embodiment, if a DPOF file exists in a recording medium while the printer 300 is connected to the camera 100, the camera may display a menu screen with the "Print . . . " item being selected, as shown in FIG. 4H-1. In this case, since the camera displays the print instruction screen shown in FIG. 4C when the user only presses the SET button 224, the printer can immediately start printing.

Figure 4H:
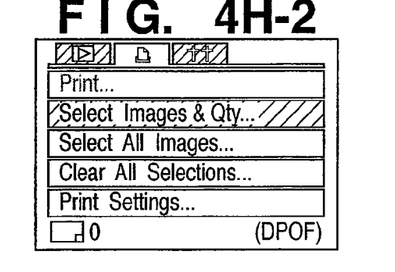

In addition, in the above embodiment, if no DPOF file exists in the recording medium 200 or 210 while the printer 300 is connected to the camera 100, the camera may display a menu screen with the "Select Images & Qty . . . " item being selected, as shown in FIG. 4H-2. In this case, since the camera displays the print image selection screen shown in FIG. 4D when the user only presses the SET button 224, the user can immediately select an image to be printed.

Furthermore, since the DPOF standard also supports an image transmission designation function, if the camera includes a communication device for communicating with a computer by wired connection using a USB cable or the like or wireless connection, designation for an image to be transferred from the camera to the computer is recorded as a DPOF file. Displaying a menu screen with the "Select Images & Qty . . . " for the selection of an image being selected at the time of the display of the menu screen makes it possible to simplify operation on the menu. This allows the user to quickly select an image to be transferred.

Moreover, if the camera includes a communication device for communicating with another camera by wired connection using a USB cable or the like or wireless connection, designation for an image to be transferred from the camera to another camera is recorded as a DPOF file. Displaying a menu screen with the "Select Images & Qty . . . " for the selection of an image being selected at the time of the display of the menu screen makes it possible to simplify operation on the menu. This allows the user to quickly select an image to be transferred.

Other Embodiment

The present invention incorporates a case wherein computer programs for implementing the functions of the embodiment described above are directly or remotely supplied to a system or apparatus. In this case, the computer of the system or the like reads out and executes the computer programs.

The computer programs themselves therefore which are installed in the computer to allow the computer to implement the functions/processing of the present invention also implement the present invention.

In this case, each program may take any form, e.g., an object code, a program executed by an interpreter, and script data supplied to an OS, as long as it has the function of the program.

As a recording medium (storage medium) for supplying the programs, a flexible disk, hard disk, optical disk, or magnetooptical disk is available. In addition, MO, CD-ROM, CD-R, CD-RW, magnetic tape, nonvolatile memory card, ROM, DVD (DVD-ROM or DVD-R), or the like is available.

In addition, methods of supplying the programs include the following. A client computer connects to a homepage on the Internet by using a browser to download each computer program of the present invention itself from the homepage or download a compressed file containing an automatic install function into a recording medium such as a hard disk. Alternatively, the programs can be supplied by dividing the program codes constituting each program of the present invention into a plurality of files, and downloading the respective files from different homepages. That is, the present invention also incorporates a WWW server which allows a plurality of users to download program files for causing the computer to execute the functions/processing of the present invention.

In addition, the programs can be supplied by encrypting the programs of the present invention, storing the encrypted data in storage media such as CD-ROMs, distributing them to users, and allowing users who satisfy a predetermined condition to download key information for decryption from a homepage through the Internet. In this case, the present invention is implemented by executing the encrypted programs using the key information and making a computer install the programs.

The functions of the above embodiment are implemented not only when the readout programs are executed by the computer but also when the OS running on the computer performs part or all of actual processing on the basis of the instructions of the programs.

The functions of the above embodiment are also implemented when the programs read out from the recording medium are written in the memory of a function expansion board inserted into the computer or a function expansion unit connected to the computer, and the CPU of the function expansion board or function expansion unit performs part or all of actual processing on the basis of the instructions of the programs.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-037253, filed Feb. 14, 2006, which is hereby incorporated by reference herein in its entirety.

What is claimed is:

1. An image pickup apparatus which performs an image pickup of an object and records a pickup image, comprising:
a display unit adapted to display an operation item for execution of operation corresponding to an operation mode of the image pickup apparatus;
a communication unit adapted to connect a printer so as to allow communication; and
a determination unit adapted to determine whether the printer is connected,
wherein said display unit displays an operation item for a print setting in an already selected state when the printer is connected and an operation item associated with an image reproducing in an already selected state when the printer is not connected.

2. The apparatus according to claim 1, wherein
the operation item comprises a plurality of sheets classified according to functions of the image pickup apparatus, and
said display unit displays a sheet associated with a connected printer in an already selected state.

3. The apparatus according to claim 1, wherein when the print a setting for a connected printer has already been set, said display unit displays an operation item for designating start of printing of the printer in an already selected state.

4. The apparatus according to claim 1, wherein when the print setting for a connected printer is not set, said display unit displays the operation item for the print setting for the connected printer in an already selected state.

5. The apparatus according to claim 1, wherein when it is determined that a printer is connected during display of another operation item, said display unit displays the operation item for the print setting in an already selected state.

6. The apparatus according to claim 1, wherein said display unit displays a menu screen for displaying an operation item in an already selected state of a predetermined operation item in accordance with an operation for moving to the menu screen.

7. A control method for an image pickup apparatus which includes an image pickup unit adapted to perform an image pickup of an object, a display unit adapted to display an operation item for execution of operation corresponding to an operation mode and a communication unit adapted to connect a printer so as to allow communication, comprising:
a determination step of determining whether the printer is connected; and
a display step of displaying, on the display unit, an operation item for a print setting in an already selected state when the printer is connected and an operation item associated with an image reproducing in an already selected state when the printer is not connected.

8. The method according to claim 7, wherein
the operation item comprises a plurality of sheets classified according to functions of the image pickup apparatus, and
in the display step, a sheet associated with a connected printer is displayed in an already selected state.

9. The method according to claim 7, wherein in the display step, when the print a setting for a connected printer has already been made, an operation item for designating start of printing of the printer is displayed in an already selected state.

10. The method according to claim 7, wherein in the display step, when the print setting is not made for a connected printer, the operation item for the print setting for the printer is displayed in an already selected state.

11. The method according to claim 7, wherein in the display step, when it is determined that a printer is connected during display of another operation item, the operation item for the print setting is displayed in an already selected state.

12. The method according to claim 7, wherein in the displaying step, a menu screen for displaying an operation item is displayed in an already selected state of a predetermined operation item in accordance with an operation for moving to the menu screen.

13. A computer-readable storage medium storing a program which causes a computer to execute a control method defined in claim 7.

* * * * *